United States Patent
Seki

(10) Patent No.: US 10,915,310 B2
(45) Date of Patent: Feb. 9, 2021

(54) CONTROL APPARATUS, PROGRAM UPDATING METHOD, AND COMPUTER PROGRAM

(71) Applicant: Sumitomo Electric Industries, Ltd., Osaka (JP)

(72) Inventor: Ryusuke Seki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/345,399

(22) PCT Filed: Dec. 25, 2017

(86) PCT No.: PCT/IB2017/001598
§ 371 (c)(1),
(2) Date: Apr. 26, 2019

(87) PCT Pub. No.: WO2018/078456
PCT Pub. Date: May 3, 2018

(65) Prior Publication Data
US 2019/0250903 A1 Aug. 15, 2019

(30) Foreign Application Priority Data
Oct. 27, 2016 (JP) .................... 2016-210154

(51) Int. Cl.
*G07C 5/00* (2006.01)
*B60R 16/033* (2006.01)
(Continued)

(52) U.S. Cl.
CPC .............. *G06F 8/65* (2013.01); *B60R 16/02* (2013.01); *B60R 16/03* (2013.01); *B60R 16/033* (2013.01);
(Continued)

(58) Field of Classification Search
CPC ............ Y02T 10/7005; Y02T 10/7044; Y02T 10/7083; G06F 8/65; G06F 8/60;
(Continued)

(56) References Cited

U.S. PATENT DOCUMENTS 9,114,721 B2 * 8/2015 Tsuda ...................... H02J 3/008
9,381,878 B2 * 7/2016 Ichikawa ................ B60R 16/03
(Continued)

FOREIGN PATENT DOCUMENTS

JP   2007-065856 A   3/2007
JP   2007-237905 A   9/2007

OTHER PUBLICATIONS

Khurram et al., Enhancing connected car adoption: Security and over the air update framework, 5 pages (Year: 2016).*

*Primary Examiner* — Thuy Dao
(74) *Attorney, Agent, or Firm* — Baker Botts L.L.P.; Michael A. Sartori

(57) ABSTRACT

Provided is a control apparatus configured to control updating of a control program of an on-vehicle control device that controls a target device installed in a vehicle including a plurality of power supplies. The control apparatus includes: a detection unit configured to detect states of the plurality of power supplies that supply power to the target device; and a determination unit configured to determine that updating of the control program is possible, when the states of the plurality of power supplies detected by the detection unit indicate that at least two of the plurality of power supplies are able to output power required for updating the control program.

9 Claims, 9 Drawing Sheets

[DETERMINATION TABLE]

| STATE | FIRST BATTERY STATE | SECOND BATTERY STATE | ALTERNATOR STATE | REPRO POSSIBLE /NOT-POSSIBLE |
|---|---|---|---|---|
| 1 | ENOUGH REMAINING POWER | ENOUGH REMAINING POWER | DRIVEN | POSSIBLE |
| 2 | ENOUGH REMAINING POWER | ENOUGH REMAINING POWER | SUSPENDED | POSSIBLE |
| 3 | ENOUGH REMAINING POWER | LITTLE REMAINING POWER | DRIVEN | POSSIBLE |
| 4 | ENOUGH REMAINING POWER | LITTLE REMAINING POWER | SUSPENDED | NOT POSSIBLE |
| 5 | LITTLE REMAINING POWER | ENOUGH REMAINING POWER | DRIVEN | POSSIBLE |
| 6 | LITTLE REMAINING POWER | ENOUGH REMAINING POWER | SUSPENDED | NOT POSSIBLE |
| 7 | LITTLE REMAINING POWER | LITTLE REMAINING POWER | DRIVEN | NOT POSSIBLE |
| 8 | LITTLE REMAINING POWER | LITTLE REMAINING POWER | SUSPENDED | NOT POSSIBLE |

(51) Int. Cl.

| | | |
|---|---|---|
| *G07C 5/08* | (2006.01) | |
| *B60R 16/03* | (2006.01) | |
| *G06F 8/65* | (2018.01) | |
| *G06F 1/28* | (2006.01) | |
| *B60W 50/00* | (2006.01) | |
| *G06F 8/60* | (2018.01) | |
| *G06F 11/00* | (2006.01) | |
| *B60R 16/02* | (2006.01) | |
| *G06F 9/445* | (2018.01) | |
| *B60K 6/28* | (2007.10) | |

(52) U.S. Cl.
CPC ............... *B60W 50/00* (2013.01); *G06F 1/28* (2013.01); *G06F 8/60* (2013.01); *G06F 9/445* (2013.01); *G06F 11/00* (2013.01); *B60K 6/28* (2013.01); *B60W 2050/0083* (2013.01); *B60W 2510/244* (2013.01); *B60Y 2200/92* (2013.01)

(58) Field of Classification Search
CPC .......... G06F 1/266; G06F 1/3212; G06F 1/28; G06F 9/445; B60R 16/02; B60R 16/03; B60R 16/033; H05B 47/19; G09F 9/33; G09F 9/13; G09F 9/3026; H02J 3/383; B60W 50/00; B60W 10/06; B60W 10/08; B60W 10/26; B60W 20/00; B60L 58/12; G07C 5/008; G07C 5/0808

See application file for complete search history.

(56) References Cited

U.S. PATENT DOCUMENTS

| | | | | |
|---|---|---|---|---|
| 9,645,969 | B2 * | 5/2017 | Tagawa | G08G 1/0129 |
| 2007/0210743 | A1 * | 9/2007 | Tabei | B60L 1/00 320/104 |
| 2012/0187759 | A1 * | 7/2012 | Kamichi | B60L 3/003 307/10.1 |
| 2013/0020997 | A1 * | 1/2013 | Iwasawa | H01M 10/441 320/116 |
| 2013/0033229 | A1 * | 2/2013 | Boyer | H02J 50/90 320/109 |
| 2018/0043785 | A1 * | 2/2018 | Takatsuka | H02J 7/00 |

* cited by examiner

FIG. 7

[DETERMINATION TABLE]

| STATE | FIRST BATTERY STATE | SECOND BATTERY STATE | ALTERNATOR STATE | REPRO POSSIBLE /NOT-POSSIBLE |
|---|---|---|---|---|
| 1 | ENOUGH REMAINING POWER | ENOUGH REMAINING POWER | DRIVEN | POSSIBLE |
| 2 | ENOUGH REMAINING POWER | ENOUGH REMAINING POWER | SUSPENDED | POSSIBLE |
| 3 | ENOUGH REMAINING POWER | LITTLE REMAINING POWER | DRIVEN | POSSIBLE |
| 4 | ENOUGH REMAINING POWER | LITTLE REMAINING POWER | SUSPENDED | NOT POSSIBLE |
| 5 | LITTLE REMAINING POWER | ENOUGH REMAINING POWER | DRIVEN | POSSIBLE |
| 6 | LITTLE REMAINING POWER | ENOUGH REMAINING POWER | SUSPENDED | NOT POSSIBLE |
| 7 | LITTLE REMAINING POWER | LITTLE REMAINING POWER | DRIVEN | NOT POSSIBLE |
| 8 | LITTLE REMAINING POWER | LITTLE REMAINING POWER | SUSPENDED | NOT POSSIBLE |

CONTROL APPARATUS, PROGRAM UPDATING METHOD, AND COMPUTER PROGRAM

TECHNICAL FIELD

The present invention relates to a control apparatus, a program updating method, and a computer program.

This application claims priority on Japanese Patent Application No. 2016-210154 filed on Oct. 27, 2016, the entire contents of which are incorporated herein by reference.

BACKGROUND ART

In the automotive field in recent years, vehicles have become progressed in functionality, and a diverse range of devices are installed in vehicles. Accordingly, vehicles are equipped with large numbers of control devices, so-called ECUs (Electronic Control Units), for controlling these on-vehicle devices.

Each vehicle is equipped with various types of ECUs such as: traveling-type ECUs that control an engine, a brake, an EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements control of an on-vehicle device by reading out a control program stored in an ROM (Read Only Memory) and executing the read control program.

Control programs of ECUs may differ depending on the destinations, grades, and the like of vehicles. Therefore, old versions of control programs need to be overwritten with new versions of control programs in response to upgrading of control programs.

For example, Patent Literature 1 discloses a technique of remotely updating programs of ECUs installed in a vehicle by means of radio communication. Specifically, a gateway of an on-vehicle communication device or the like receives an updating program from a management server, and an ECU overwrites an old version of control program with a new version of control program by using the received updating program.

CITATION LIST

Patent Literature

PATENT LITERATURE 1: Japanese Laid-Open Patent Publication No. 2007-65856
PATENT LITERATURE 2: Japanese Laid-Open Patent Publication No. 2007-237905

SUMMARY OF INVENTION

A control apparatus according to one embodiment is a control apparatus configured to control updating of a control program of an on-vehicle control device that controls a target device installed in a vehicle including a plurality of power supplies. The control apparatus includes: a detection unit configured to detect states of the plurality of power supplies that supply power to the target device; and a determination unit configured to determine that updating of the control program is possible, when the states of the plurality of power supplies detected by the detection unit indicate that at least two of the plurality of power supplies are able to output power required for updating the control program.

A program updating method according to another embodiment is a method for updating a control program of an on-vehicle control device that controls a target device installed in a vehicle including a plurality of power supplies. The method includes the steps of: detecting states of the plurality of power supplies that supply power to the target device; and determining that updating of the control program is possible, when the detected states of the plurality of power supplies indicate that at least two of the plurality of power supplies are able to output power required for updating the control program.

A computer program according to still another embodiment is a computer program for causing a computer to function as a control apparatus configured to control updating of a control program of an on-vehicle control device that controls a target device installed in a vehicle including a plurality of power supplies. The computer program causes the computer to function as: a detection unit configured to detect states of the plurality of power supplies that supply power to the target device; and a determination unit configured to determine that updating of the control program is possible, when the states of the plurality of power supplies detected by the detection unit indicate that at least two of the plurality of power supplies are able to output power required for updating the control program.

BRIEF DESCRIPTION OF DRAWINGS

FIG. 7 is a diagram showing an example of a determination table used for determining whether or not updating of a control program is possible.

DESCRIPTION OF EMBODIMENTS

Figure 1:
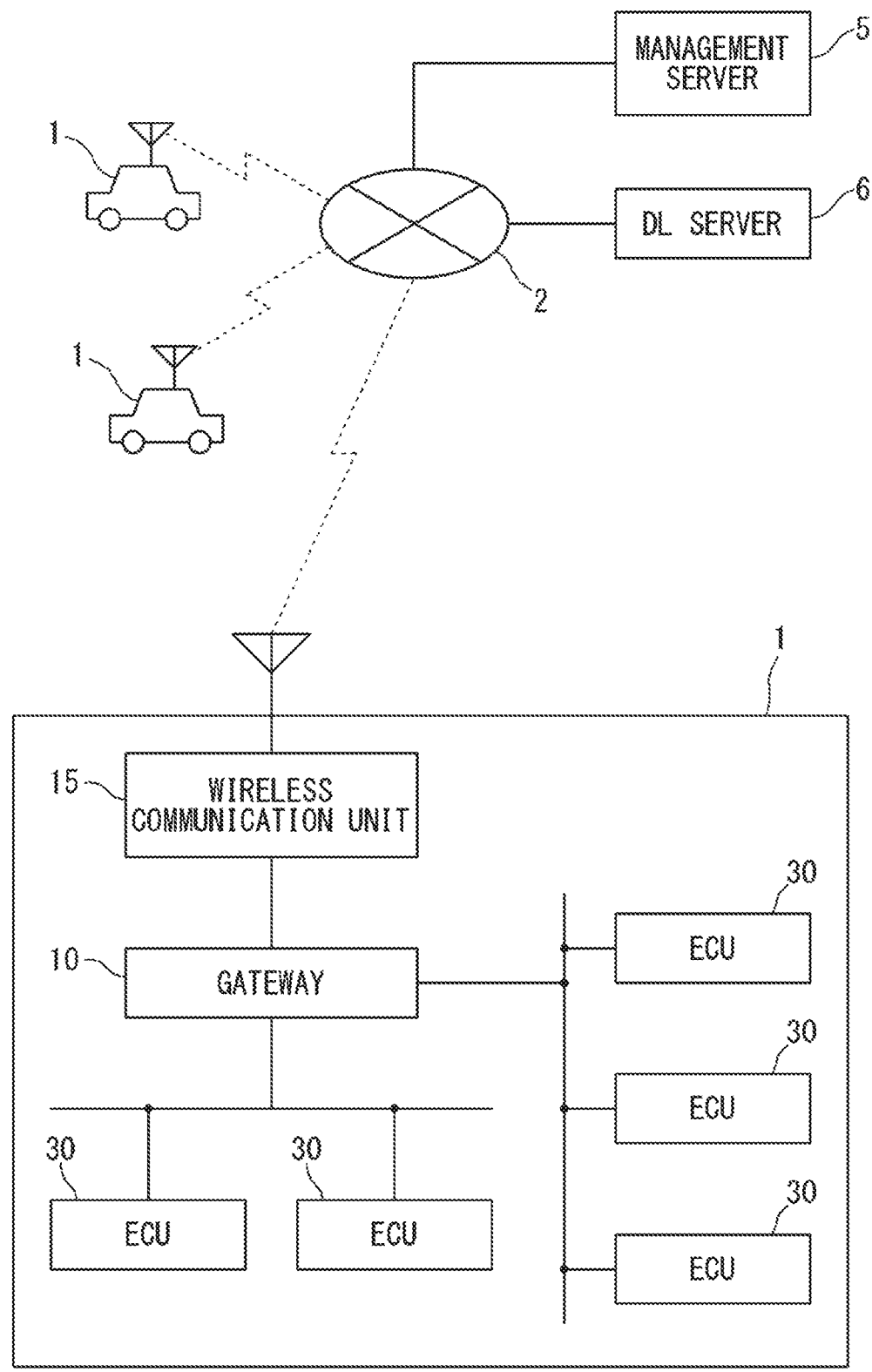
FIG. 1 is a diagram showing an overall configuration of a program updating system according to an embodiment.

Problems to be Solved by the Present Disclosure

If voltage of a battery that supplies power to an ECU whose control program is to be updated is reduced, the ECU does not normally operate, and updating is not normally performed. Then, updating of the control program may be interrupted, and the interruption may cause destruction of the program. In order to solve this problem, Japanese Laid-Open Patent Publication No. 2007-237905 (Patent Literature 2) discloses a system for a hybrid vehicle equipped with a main battery and a sub-battery having a voltage lower than that of the main battery, in which when the voltage of the sub-battery that supplies power to an ECU is lower than a voltage that enables updating, an updating process is not executed, and the sub-battery is charged from the main battery.

In the system disclosed in Patent Literature 2, however, if the voltage of the power supply that supplies power to the ECU is reduced during updating, the updating process is interrupted. Therefore, the aforementioned problem still remains unsolved.

An object in one aspect of the present disclosure is to provide a control apparatus, a program updating method, and a computer program which enable reliable updating of control programs in a vehicle equipped with a plurality of power supplies.

Effect of the Disclosure

According to this disclosure, it is possible to reliably update control programs in a vehicle equipped with a plurality of power supplies.

Description of Embodiments

Embodiments of the present invention include at least the following.

That is, a control device included in the embodiments is a control apparatus configured to control updating of a control program of an on-vehicle control device that controls a target device installed in a vehicle including a plurality of power supplies. The control apparatus includes: a detection unit configured to detect states of the plurality of power supplies that supply power to the target device; and a determination unit configured to determine that updating of the control program is possible, when the states of the plurality of power supplies detected by the detection unit indicate that at least two of the plurality of power supplies are able to output power required for updating the control program.

According to this configuration, when updating of the control program in the on-vehicle control device is performed, two or more power supplies are present which are able to supply power required for updating the control program. Therefore, even if the power of one of the power supplies is reduced during updating of the control program, power can be supplied from the other power supply. Accordingly, updating of the control program is reliably executed without being interrupted.

Preferably, the determination unit determines whether or not updating of the control program is possible, with reference to a determination table in which a result of determination as to whether or not updating of the control program is possible is defined in advance for each of combinations of the states of the plurality of power supplies.

Therefore, it is possible to easily and accurately determine whether or not updating of the control program is possible.

Preferably, the determination unit determines whether or not updating of the control program is possible, by using a determination function that is defined so as to output a predetermined value for each of the states of the plurality of power supplies.

Therefore, it is possible to easily and accurately determine whether or not updating of the control program is possible.

Preferably, the plurality of power supplies include a storage battery, and the states of the power supplies detected by the detection unit include an amount of remaining power of the storage battery.

Therefore, even if the power of one of the power supplies is reduced during updating of the control program, power can be supplied from the other storage battery. Accordingly, updating of the control program is reliably executed without being interrupted.

Preferably, the detection unit calculates the amount of remaining power by multiplying a full charge capacity of the storage battery by a state of charge (SOC) of the storage battery.

Thus, the amount of remaining power can be obtained from the full charge capacity of the storage battery.

Preferably, the detection unit further calculates the full charge capacity of the storage battery by multiplying a design capacity of the storage battery by a state of health (SOH) of the storage battery.

Thus, the full charge capacity can be obtained from the design capacity of the storage battery, and the amount of remaining power can be obtained by use of the full charge capacity.

Preferably, the plurality of power supplies include an electric generator, and the states of the power supplies detected by the detection unit include whether or not the electric generator is being driven.

Therefore, even if the power of one of the power supplies is reduced during updating of the control program, power can be supplied from the electric generator being driven. Accordingly, updating of the control program is reliably executed without being interrupted.

A program updating method included in the embodiments is a method for updating a control program of an on-vehicle control device that controls a target device installed in a vehicle including a plurality of power supplies. The method includes the steps of: detecting states of the plurality of power supplies that supply power to the target device; and determining that updating of the control program is possible, when the detected states of the plurality of power supplies indicate that at least two of the plurality of power supplies are able to output power required for updating the control program.

According to this configuration, when updating of the control program in the on-vehicle control device is performed, two or more power supplies are present which are able to supply power required for updating the control program. Therefore, even if the power of one of the power supplies is reduced during updating of the control program, power can be supplied from the other power supply. Accordingly, updating of the control program is reliably executed without being interrupted.

A computer program included in the embodiments is a computer program for causing a computer to function as a control apparatus configured to control updating of a control program of an on-vehicle control device that controls a target device installed in a vehicle including a plurality of power supplies. The computer program causes the computer to function as: a detection unit configured to detect states of the plurality of power supplies that supply power to the target device; and a determination unit configured to determine that updating of the control program is possible, when the states of the plurality of power supplies detected by the detection unit indicate that at least two of the plurality of power supplies are able to output power required for updating the control program.

According to this configuration, when updating of the control program in the on-vehicle control device is performed, two or more power supplies are present which are able to supply power required for updating the control program. Therefore, even if the power of one of the power supplies is reduced during updating of the control program, power can be supplied from the other power supply. Accordingly, updating of the control program is reliably executed without being interrupted.

Detailed Description of Embodiment

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program updating system according to a first embodiment.

As shown in FIG. 1, the program updating system of this embodiment includes vehicles 1, a management server 5, and a DL (download) server 6 which are communicable with each other via a wide-area communication network 2.

The management server 5 and a DL server 6 are operated by, for example, the automobile manufacturer of the vehicles 1, and are communicable with large numbers of vehicles 1 owned by users registered as members in advance.

Each vehicle 1 is equipped with a gateway 10, a wireless communication unit 15, a plurality of ECUs 30, and various on-vehicle devices (not shown) controlled by the respective ECUs 30.

A plurality of communication groups, each being formed by a plurality of ECUs 30 bus connected to a common in-vehicle communication line, are present in the vehicle 1, and the gateway 10 relays communication between the communication groups. Therefore, a plurality of in-vehicle communication lines are connected to the gateway 10.

The wireless communication unit 15 is communicably connected to the wide-area communication network 2 such as a mobile phone network, and is connected to the gateway 10 via an in-vehicle communication line. The gateway 10 transmits, to the ECUs 30, information received from external devices such as the management server 5 and the DL server 6 through the wide-area communication network 2 by the wireless communication unit 15.

The gateway 10 transmits information obtained from the ECUs 30 to the wireless communication unit 15, and the wireless communication unit 15 transmits the information to the external devices such as the management server 5.

As for the wireless communication unit 15 installed in the vehicle 1, devices such as a mobile phone, a smart phone, a tablet-type terminal, and a notebook PC (Personal Computer) possessed by the user are conceivable.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program updating system shown in FIG. 1, the management server 5 and the DL server 6 are configured as separated servers. However, these serves 5 and 6 may be configured as a single server unit.

[Internal Configuration of Gateway]

Figure 2:
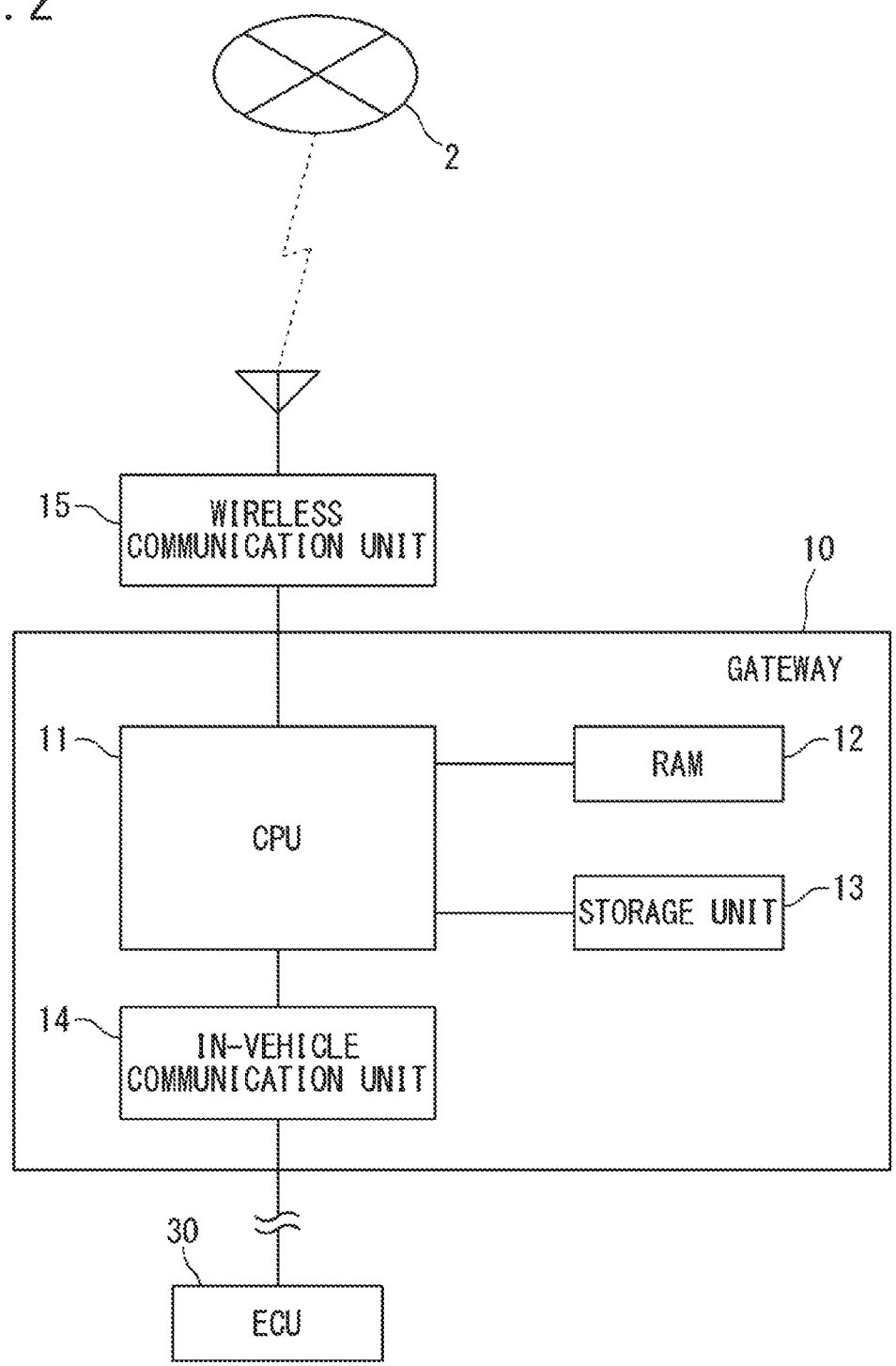
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single device.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. The CPU 11 may be a CPU representing a plurality of CPU groups. In this case, a function to be implemented by the CPU 11 is implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission (download) from a computer device such as a server computer.

In this aspect, the same applies to a computer program executed by a CPU 31 of the ECU 30 (refer to FIG. 3) described later, and a computer program executed by a CPU 51 of the management server 5 (refer to FIG. 4) described later.

The storage unit 13 consists of, for example, a nonvolatile memory element such as a flash memory or an EEPROM. The storage unit 13 has a storage area in which programs to be executed by the CPU 11, data required in executing the programs, and the like are stored. In the storage unit 13, updating programs of the respective ECUs 30 received from the DL server 6, and the like are also stored.

The plurality of ECUs 30 are connected to the in-vehicle communication unit 14 via the in-vehicle communication lines arranged in the vehicle 1. The in-vehicle communication unit 14 communicates with the ECUs 30 according to a standard such as CAN (Controller Area Network), CANFD (CAN with Flexible Data Rate), LIN (Local Interconnect Network), Ethernet (registered trademark), or MOST (Media Oriented Systems Transport: MOST is registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 according to other communication standards that are used for an on-vehicle network, apart from the above communication standards.

The wireless communication unit 15 consists of a wireless communication apparatus including an antenna and a communication circuit that executes transmission/reception of radio signals from the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay device inside the vehicle 1 may be adopted. The wired communication unit has a connector to which a communication cable conforming to a standard such as USB (Universal Serial Bus) or RS232C is connected, and performs wired communication with another communication device connected thereto via the communication cable.

If the other communication device and the external device such as the management server 5 can wirelessly communicate with each other via the wide-area communication network 2, the external device and the gateway 10 are communicable with each other through a communication path consisting of, in order, the external device, the other communication device, the wired communication unit, and the gateway 10.

[Internal Configuration of ECU]

Figure 3:
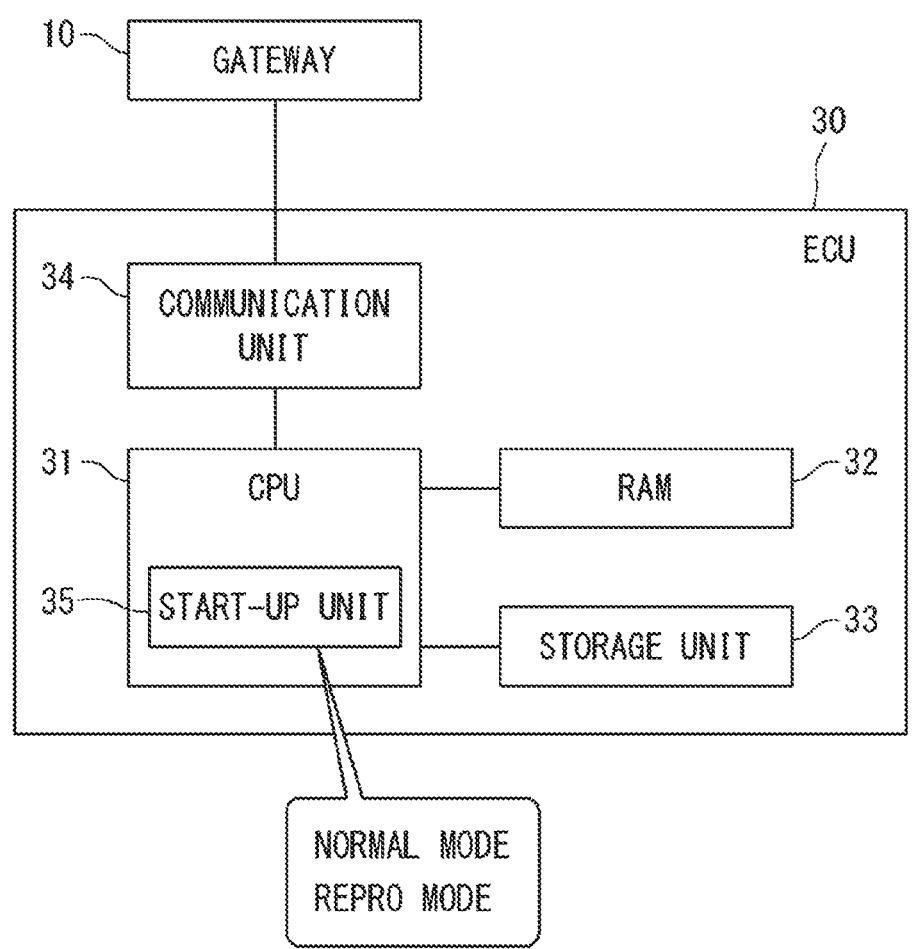
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECU 30 is an on-vehicle control device that individually controls a target device installed in the vehicle 1. Examples of the types of ECUs 30 include a power supply control ECU, an engine control ECU, a steering control ECU, and a door lock control ECU.

The CPU 31 controls the operation of a target device that the CPU 31 is in charge of, by reading out one or a plurality of programs previously stored in the storage unit 33 to the RAM 32 and executing the read programs. The CPU 31 may also be a CPU representing a plurality of CPU groups, and a control to be performed by the CPU 31 may be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of a nonvolatile memory element such as a flash memory or an EEPROM, or a magnetic storage device such as a hard disk.

Information stored in the storage unit 33 includes, for example, a computer program (hereinafter referred to as "control program") that causes the CPU 31 to execute information processing for controlling a target device that is a control target inside the vehicle.

The gateway 10 is connected to the communication unit 34 via the in-vehicle communication lines arranged in the vehicle 1. The communication unit 34 communicates with the gateway 10 according to a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 according to other communication standards that are used for the on-vehicle network, apart from the above communication standards.

The CPU 31 of the ECU 30 includes a start-up unit 35 that switches the mode of control performed by the CPU 31 between a "normal mode" and a "reprogramming mode" (hereinafter also referred to as "repro mode").

The normal mode is a control mode in which the CPU 31 of the ECU 30 executes original control for the target device (e.g., engine control for a fuel engine or door lock control for a door lock motor).

The reprogramming mode is a control mode in which the CPU 31 updates the control program used for controlling the target device.

That is, the reprogramming mode is a control mode in which the CPU 31 performs erasing/overwriting of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

[Internal Structure of Management Server]

Figure 4:
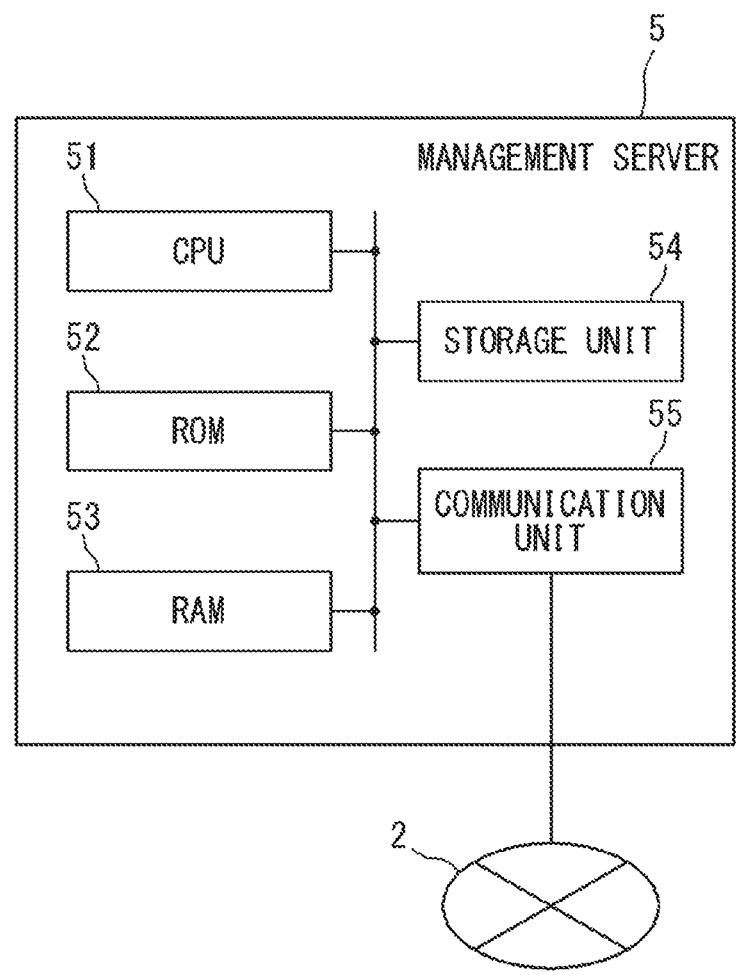
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is communicable with the gateway 10. The CPU 51 may also be a CPU representing a plurality of CPU groups, and a function to be implemented by the CPU 51 may be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of a nonvolatile memory element such as a flash memory or an EEPROM, or a magnetic storage device such as a hard disk.

The communication unit 55 consists of a communication device that executes a communication process according to a predetermined communication standard. The communication unit 55 executes the communication process while being connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence]

Figure 5:
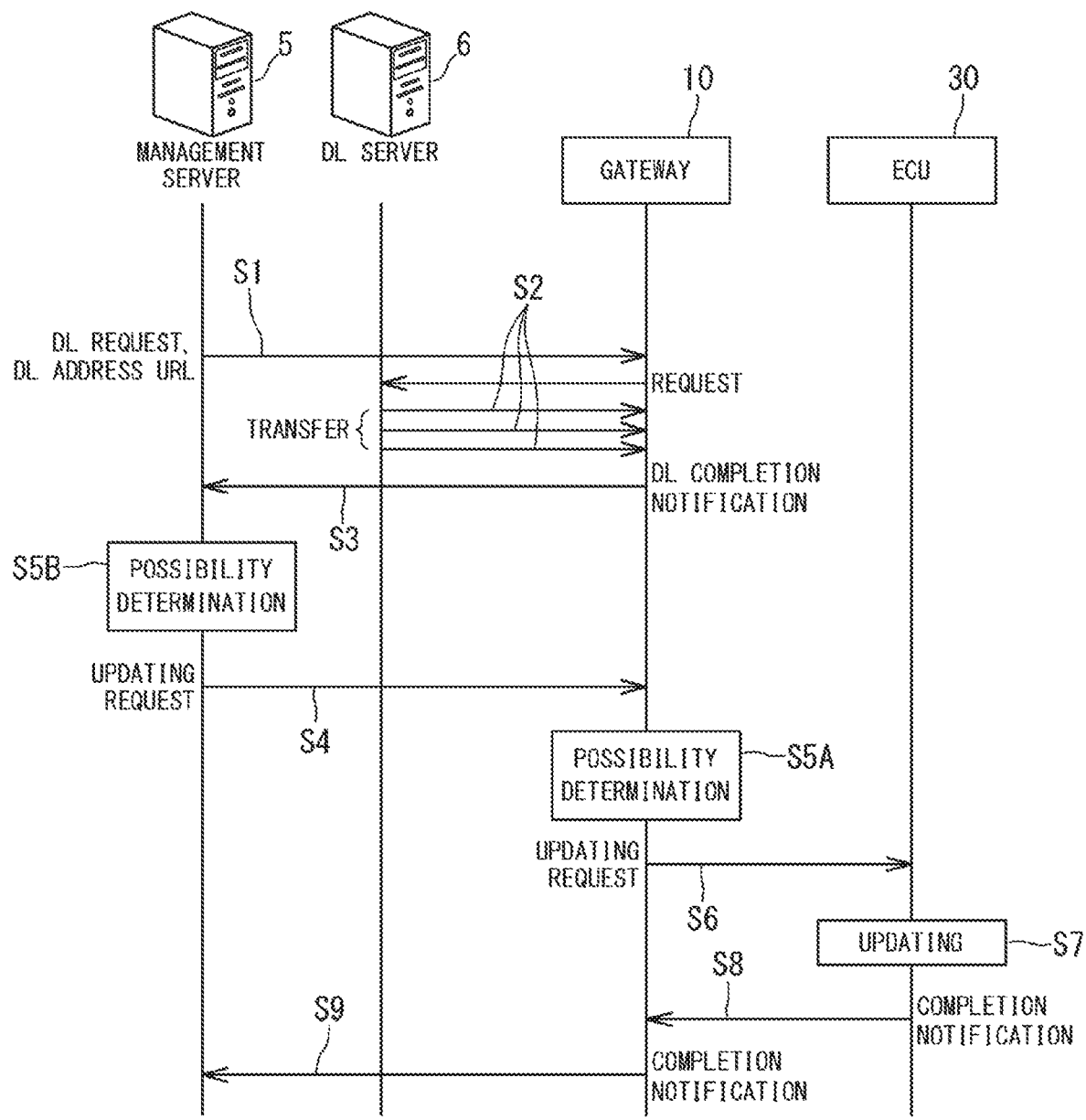
FIG. 5 is a sequence diagram showing an example of updating of a control program of the ECU.

FIG. 5 is a sequence diagram showing an example of updating of a control program for an ECU, which is executed in the program updating system of the present embodiment. For example, the management server 5 determines timing to update a control program of an ECU of a vehicle 1 that has been registered in advance. The timing of updating may be set by the automobile manufacturer of the vehicle 1, for example.

When the timing to update the control program of the ECU has come, the management server 5 transmits a download request and a URL where an updating program for the ECU 30 is stored, to the gateway 10 of the corresponding vehicle 1 (step S1).

Thereby, the gateway 10 downloads the updating program for the ECU 30 from the DL server 6 (step S2). The gateway 10 temporarily stores the received updating program in the storage unit 13 thereof.

Upon completion of the storage of the updating program, the gateway 10 notifies the management server 5 that DL has been normally completed (step S3). If updating is automatically continued, the management server 5, which has received the DL completion notification, transmits a control program updating request to the gateway 10. After completion of DL, the management server 5 may temporarily suspend the process, and may transmit a control program updating request to the gateway 10 upon receiving an updating request from the outside (step S4).

Upon receiving the updating request, the gateway 10 determines whether or not updating of the control program is possible, based on the states of a plurality of power supplies installed in the vehicle 1 (step S5A). Upon determining that updating of the control program is possible, the gateway 10 transmits a control program updating request to the corresponding ECU 30 in order to update the control program by using the updating program stored in the storage unit 13 (step S6). In step S6, the gateway 10 may notify the user that updating of the control program is possible, and may request the ECU 30 to perform updating, in response to a user operation for starting updating.

Upon receiving the control program updating request, the ECU 30 switches the control mode thereof from the normal mode to the repro mode. Thereby, the ECU becomes able to perform a control program updating process.

The ECU 30 expands the received updating program and applies the updating program to the old version of the control program, thereby overwriting the control program from the old version to the new version (step S7). Upon completion of the overwriting, the ECU 30 transmits a overwriting completion notification to the gateway 10 (step S8). Upon receiving the overwriting completion notification from the corresponding ECU 30, the gateway 10 transmits an updating completion notification to the management server 5 (step S9).

[Power Supply Configuration of Vehicle]

Figure 6:
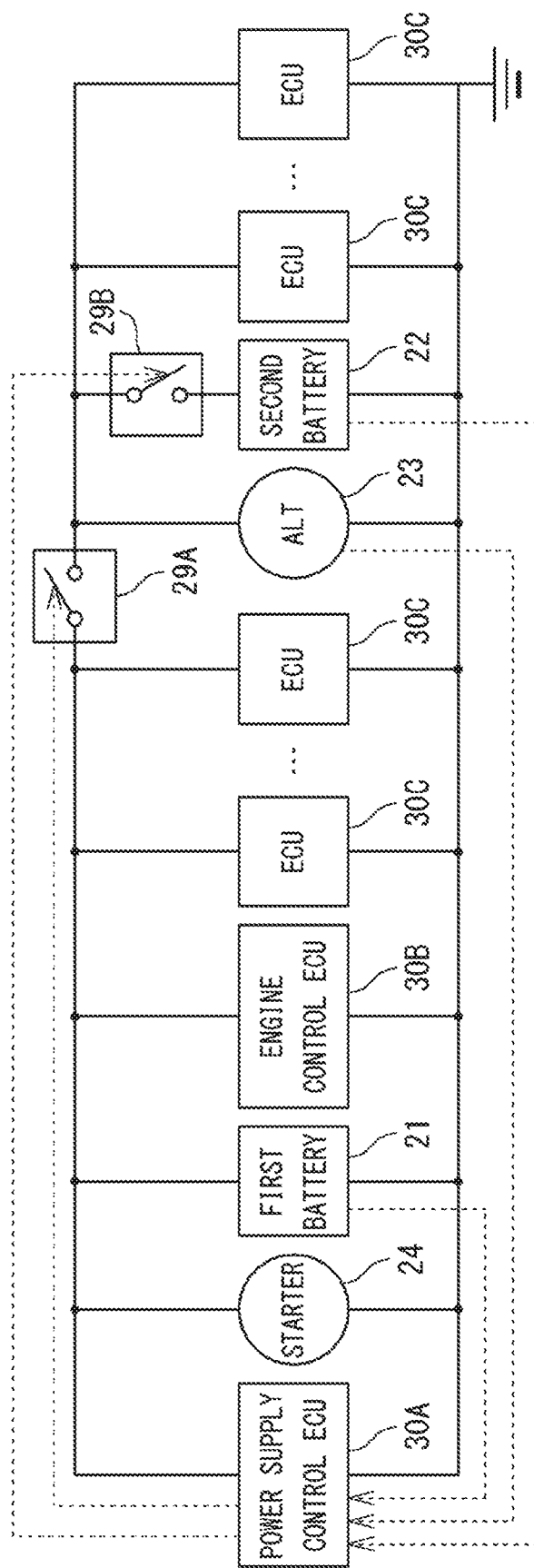
FIG. 6 is a schematic diagram showing an example of a power supply configuration of a vehicle included in the program updating system.

FIG. 6 is a schematic diagram showing an example of a power supply configuration of the vehicle 1. FIG. 6 shows an example of a power supply configuration of a conventional type vehicle, that is not a hybrid vehicle, which is called a conventional vehicle. With reference to FIG. 6, the vehicle 1 includes a first battery 21 as a main battery, a second battery 22 as a sub-battery, and an alternator (ALT) 23. These are a plurality of power supplies installed in the vehicle 1.

Figure 9:
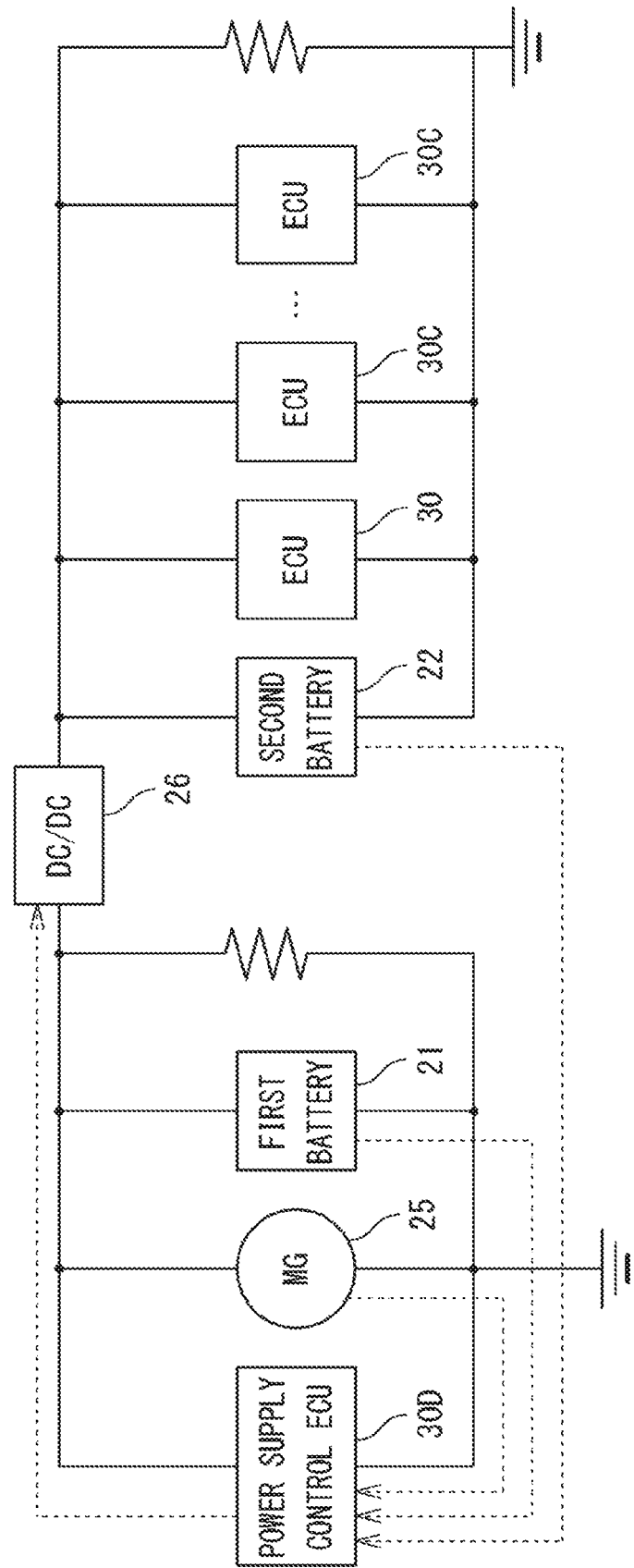
FIG. 9 is a schematic diagram showing another example of a power supply configuration of a vehicle included in the program updating system.

The first battery 21 and the second battery 22 may have the same voltage such as 12 V, or may have different voltages such as 48 V and 12 V, respectively, as in an example shown in FIG. 9 described later. As for the batteries 21 and 22, a lead-acid battery is generally used. Alternatively, a lithium ion battery, a nickel hydrogen battery, or a combination thereof may be used.

The first battery 21 mainly supplies power to a driving system. A power supply control ECU 30A, an engine control ECU 30B, and a starter 24 for engine start-up are connected to the first battery 21, and are supplied with power from the first battery 21. Further, a plurality of ECUs 30C are connected to the first battery 21, and are supplied with power from the first battery 21.

The second battery 22 supplies power to other power systems. The other power systems are, for example, an interior light, an air conditioner, and door lock. A plurality of ECUs 30C for controlling these power systems are connected to the second battery 22, and are supplied with power from the second battery 22.

Preferably, relays 29A and 29B are connected to the first battery 21 and the second battery 22.

When both the relays 29A and 29B are ON (relay state), power is supplied from the first battery 21, the second battery 22, and the ALT 23 to the power supply control ECU 30A and the engine control ECU 30B and to the plurality of ECUs 30C.

When the relay 29A is ON and the relay 29B is OFF (cut state), power is supplied from the first battery 21 and the ALT 23 to the power supply control ECU 30A and the engine control ECU 30B and to the plurality of ECUs 30C.

When the relay 29A is OFF and the relay 29B is ON, power is supplied from the second battery 22 and the ALT 23 to the power supply control ECU 30A and the engine control ECU 30B and to the plurality of ECUs 30C.

The power supply control ECU 30A has the internal configuration shown in FIG. 3. The CPU 31 of the power supply control ECU 30A controls the first battery 21, the second battery 22, and the ALT 23 which are a plurality of power supplies, by reading out one or a plurality of programs previously stored in the storage unit 33 to the RAM 32 and executing the read programs. Further, the CPU 31 of the power supply control ECU 30A controls ON/OFF of the relays 29A and 29B, thereby controlling supply of power from these power supplies. In FIG. 6, dotted lines indicate flow of signals between the power supply control ECU 30A and the devices to be controlled. In the program updating system according to the first embodiment, the CPU 31 of the power supply control ECU 30A causes both the relays 29A and 29B to be maintained in their ON states.

The CPU 31 of the power supply control ECU 30A obtains, from the plurality of power supplies, signals indicating their own the states. The states of the batteries 21 and 22 indicate the charge amounts thereof. The state of the ALT 23 indicates whether the ALT 23 is being driven or suspended, that is, whether or not the ALT 23 is generating power. In other words, the CPU 31 of the power supply control ECU 30A functions as a detection unit that detects the states of the plurality of power supplies.

In FIG. 6, the aforementioned power supply control is performed by the power supply control ECU 30A. Also in the following description, the power supply control is performed by the power supply control ECU 30A. However, the power supply control may be performed not only by the power supply control ECU 30A but also by the engine control ECU 30B or the other ECUs 30C, or may be realized by these ECUs in cooperation.

[Functional Configuration of Gateway]

The CPU 11 of the gateway 10 determines whether or not updating of the control program in the target ECU is possible, based on the states of the plurality of power supplies installed in the vehicle 1. The CPU 11 functions as a determination unit that performs the aforementioned determination, by reading out one or a plurality of programs stored in the storage unit 13 and executing the read programs.

The CPU 11 of the gateway 10, which functions as the determination unit, determines whether or not updating of the control program is possible, in accordance with a criterion that a control program updating process is executed in a case where at least two power supplies among the plurality of power supplies that supply power to the ECU are able to output power required for updating the control program.

A case where a battery is able to output power required for updating a control program is a case where the battery stores an amount of power equal to or greater than an amount of power required for updating the control program. Preferably, a case where a battery is able to output power required for updating a control program is a case where the power stored in the battery is by a prescribed amount (or prescribed percentage) or more greater than the amount of power required for updating the control program.

A case where an ALT is able to output power required for updating a control program is a case where the ALT is being driven (generating power). Preferably, a case where an ALT is able to output power required for updating a control program is a case where the ALT is generating power and the amount of the generated power is equal to or greater than the amount of power required for updating the control program. More specifically, the amount of the generated power is by a prescribed amount (or prescribed percentage) or more greater than the amount of power required for updating the control program.

For example, the CPU 11 of the gateway 10 determines whether or not updating of the control program is possible, with reference to information that has previously defined the result of determination as to whether or not updating of the control program is possible, based on the states of the respective power supplies. The information that has previously defined the result of determination as to whether or not updating of the control program is possible, based on the states of the respective power supplies, is a determination table, for example. The determination table is stored in the storage unit 13 of the gateway 10, for example.

FIG. 7 shows an example of a determination table used by the CPU 11 of the gateway 10 for determination as to whether or not updating of the control program is possible. In FIG. 7, for each of the power supply states that can be taken by the vehicle 1 having the power supply configuration shown in FIG. 6, the result of determination as to whether or not updating of the control program is possible has previously been defined.

With reference to FIG. 7, the determination table includes items of "first battery state", "second battery state", "alternator state", and "repro possible/not-possible".

The "first battery state" is an item indicating the state of the first battery 21, and the "second battery state" is an item indicating the state of the second battery 22. In the items of "first battery state" and "second battery state", "enough remaining power" meaning that the battery is able to output power required for updating the control program or "little remaining power" meaning that the battery cannot output the required power, is described.

The "alternator state" is an item indicating the state of the ALT 23. In the item of "alternator state", "driven" meaning that the ALT 23 is generating power or "suspended" meaning that the ALT 23 is not generating power, is described.

The "repro possible/not-possible" is an item indicating the result of determination as to whether or not updating of the control program is possible. In the item of "repro possible/not-possible", "possible" meaning the determination result that updating is possible or "not-possible" meaning the determination result that updating is not possible, is described.

The vehicle 1 can take the following power supply states 1 to 8, each state being a combination of "first battery state", "second battery state", and "alternator state" which are a plurality of power supply states. The determination table defines, for each of the states 1 to 8, the result of determination as to whether or not updating of the control program is possible.

In the state 1, the first battery 21 has "enough remaining power", the second battery 22 has "enough remaining power", and the ALT 23 is being "driven". The state 1 is assumed to be a state in which the engine is normally operating. The determination result for the state 1 is defined as "possible".

In the state 2, the first battery 21 has "enough remaining power", the second battery 22 has "enough remaining power", and the ALT 23 is being "suspended". The state 2 is assumed to be a state in which the engine is stopped during coasting, or normal idling stop. The determination result for the state 2 is defined as "possible".

In the state 3, the first battery 21 has "enough remaining power", the second battery 22 has "little remaining power", and the ALT 23 is being "driven". The state 3 is assumed to be a state immediately after restart of the engine from idling stop during engine stop or a state in which the engine is operating and the second battery 22 is in an abnormal state. The determination result for the state 3 is defined as "possible".

In the state 4, the first battery 21 has "enough remaining power", the second battery 22 has "little remaining power", and the ALT 23 is being "suspended". The state 4 is assumed to be a state in which the engine is stopped and power consumption of an electric system such as an air conditioner is great. The determination result for the state 4 is defined as "not possible".

In the state 5, the first battery 21 has "little remaining power", the second battery 22 has "enough remaining power", and the ALT 23 is being "driven". The state 5 is assumed to be a state in which the vehicle 1 is traveling (the engine is operating) and power consumption of an electric system such as an air conditioner is great. The determination result for the state 5 is defined as "possible".

In the state 6, the first battery 21 has "little remaining power", the second battery 22 has "enough remaining power", and the ALT 23 is being "suspended". The state 6 is assumed to be a state where the vehicle 1 has been parked for a long time with the engine being stopped. The determination result for the state 6 is defined as "not possible".

In the state 7, the first battery 21 has "little remaining power", the second battery 22 has "little remaining power", and the ALT 23 is being "driven". The state 7 is assumed to be a state in which the vehicle 1 is traveling, power consumption of an electric system such as an air conditioner is great, and the engine has just been restarted. The determination result for the state 7 is defined as "not possible".

In the state 8, the first battery 21 has "little remaining power", the second battery 22 has "little remaining power", and the ALT 23 is being "suspended". The state 8 is assumed to be a state in which the vehicle 1 has been parked for a long time with the engine being stopped after considerable power consumption by an electric system such as an air conditioner. The determination result for the state 8 is defined as "not possible".

[Process for Determining Whether or not Updating of Control Program is Possible]

Figure 8:
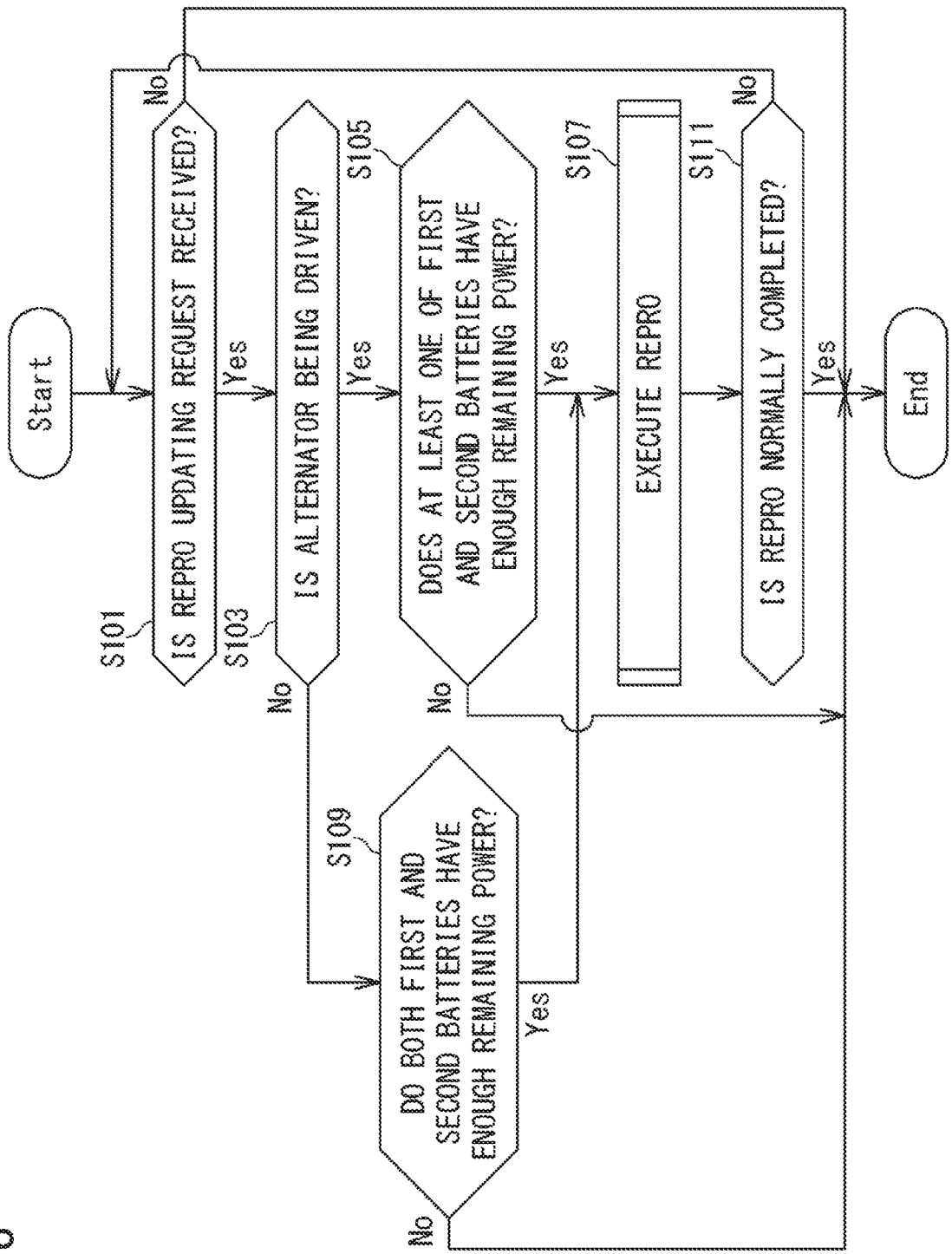
FIG. 8 is a flowchart showing a specific content of a process for determining whether or not updating of the control program is possible, in step S5A shown in FIG. 5.

FIG. 8 is a flowchart showing a specific content of the process for determining whether or not updating of the control program is possible, in step S5A shown in FIG. 5. FIG. 8 shows a specific example of the process for determining whether or not updating of the control program is possible in a case where the determination is made by the gateway 10 installed in the vehicle 1 having the power supply configuration shown in FIG. 6. The process shown in the flowchart of FIG. 8 is mainly implemented by the CPU 11 of the gateway 10 when the CPU 11 reads out one or a plurality of programs stored in the storage unit 13 to the RAM 12, and executes the read programs.

With reference to FIG. 8, upon receiving a request for updating the control program from the management server 5 (YES in step S101), the CPU 11 of the gateway 10 obtains the states of the respective power supplies (first battery 21, second battery 22, and ALT 23) from the power supply control ECU 30A (steps S103, S105, and S109). The CPU 11 determines whether or not updating is possible, based on the states of the respective power supplies, with reference to the determination table stored in the storage unit 13. Then, based on the determination result, the CPU 11 instructs the target ECU 30 to update the control program. Thus, updating is executed (step S107).

For example, the CPU 11 determines whether or not the ALT 23 is being driven (step S103). When the ALT 23 is being driven (YES in step S103), the CPU 11 determines whether or not at least one of the first battery 21 and the second battery 22 is in the state of having "enough remaining power" (step S105). If at least one of the first battery 21 and the second battery 22 is in the state of having "enough remaining power" (YES in step S103, and YES in step S105), the CPU 11 determines that updating of the control program is "possible", with reference to the determination table. Based on the determination result, the CPU 11 instructs the ECU 30 to update the control program.

When both the batteries are in the state of having "little remaining power" (YES in step S103, and NO in step S105), the CPU 11 determines that updating of the control program is "not possible", with reference to the determination table. Based on the determination result, the CPU 11 ends the series of process steps without instructing the ECU 30 to update the control program. After a prescribed time has passed, the CPU 11 may repeat the process steps from step S103.

When the ALT 23 is being suspended (NO in step S103), the CPU 11 determines whether or not both the first battery 21 and the second battery 22 are in the state of having "enough remaining power" (step S109). When both the batteries are in the state of having "enough remaining power" (NO in step S103, and YES in step S109), the CPU 11 determines that updating of the control program is "possible", with reference to the determination table. Based on the determination result, the CPU 11 instructs the ECU 30 to update the control program.

When either the first battery 21 or the second battery 22 is in the state of having "little remaining power" (NO in step S103, and NO in step S109), the CPU 11 determines that updating of the control program is "not possible", with reference to the determination table. Based on the determination result, the CPU 11 ends the series of process steps without instructing the ECU 30 to update the control program. Also in this case, after a prescribed time has passed, the CPU 11 may repeat the process steps from step S103.

The CPU 11 may end the series of process steps when receiving a program updating completion notification from the ECU 30 (YES in step S111). If the CPU 11 does not receive the program updating completion notification from the ECU 30, that is, if updating of the program has not been normally finished in the ECU 30 (NO in step S111), the CPU 11 may repeat the series of process steps from step S101.

[Effect of First Embodiment]

According to the program updating system of the first embodiment, when at least two power supplies, which are installed in a vehicle 1 and configured to supply power to an ECU, are able to output power required for updating a control program, it is determined that updating of the control program is possible. Thus, when two or more power supplies are able to output power required for updating the control program, updating of the control program is started. Otherwise, that is, if the number of power supplies capable of outputting power required for updating the control program is less than 2, updating of the control program is not performed.

For example, it is assumed that only the first battery that supplies power to an ECU whose control program is to be updated is able to output power required for updating the control program, while the other power supplies are not able to output the required power. In this case, if the voltage of the first battery is reduced due to the updating of the control program in the ECU or any other reason, the updating of the control program may be interrupted.

In such a case, in the program updating system of the present embodiment, power required for updating the control program is supplied from a power supply (e.g., the second battery) other than the first battery to the ECU. Therefore, the updating of the control program in the ECU is prevented from being interrupted. In this way, according to the program updating system of the present embodiment, updating of the control program can be reliably performed.

Second Embodient

In a program updating system according to a second embodiment, the CPU 31 of the power supply control ECU 30A changes the power supplying state by changing ON/OFF of the relays 29A and 29B in accordance with the normal mode and the repro mode. Further, when the charge amount in a battery becomes equal to or less than a prescribed amount, in order to cause another power supply to supply power, the CPU 31 of the power supply control ECU 30A may change the power supplying state by changing ON/OFF of the relays 29A and 29B. That is, in the second embodiment, the CPU 31 of the power supply control ECU 30A controls ON/OFF of the relays 29A and 29B in accordance with the normal mode and the repro mode and/or the charge amount in the battery.

Further, in the second embodiment, the CPU 31 of the power supply control ECU 30A may control ON/OFF of the relays 29A and 29B, in accordance with the power supply states 1 to 8 that the vehicle 1 can take, such that a battery in the state of having "enough remaining power" or the ALT 23 being driven charges a battery that is in the state of having "little remaining power" and supplies power to an ECU whose control program is to be updated.

[Effect of Second Embodiment]

Even in the case where a plurality of power supplies are installed in the vehicle 1 and one or a plurality of ECUs to which the respective power supplies supply power in the normal mode are prescribed, the program updating system according to the second embodiment can change the destination of power from each power supply between the repro mode and the normal mode. Thus, it is possible to avoid reduction in power of the battery that supplies power to the ECU whose control program is to be updated, thereby avoiding interruption of updating of the control program in the ECU. Therefore, also in the control program updating system according to the present embodiment, updating of the control program can be reliably performed.

Third Embodiment

In the program updating systems according to the first and second embodiments, the gateway 10 determines whether or not updating of a program is possible. However, a device other than the gateway 10 may determine whether or not updating of the program is possible. For example, the management server 5 may perform the determination. The management server 5 according to the third embodiment determines whether or not updating is possible, at the timing of step S5B shown in FIG. 5. That is, upon being notified by the gateway 10 that download of the updating program has been completed, the management server 5 determines whether or not updating is possible (step S5B), and requests the gateway 10 to perform updating, at the timing when the management server 5 has determined that updating is possible (step S4).

In this case, the CPU 51 of the management server 5 has the function of determining whether or not updating of the program is possible. This function is mainly implemented by the CPU 51 when the CPU 51 read out one or a plurality of programs stored in the ROM 52 and execute the read programs. However, at least a part of the function may be implemented by hardware such as an electric circuit.

The determination table shown in FIG. 7 is stored in the storage unit 55 of the management server 5. The CPU 51 of the management server 5 obtains, from the gateway 10, signals indicating the states of the plurality of power supplies that are installed in the vehicle 1 and supply power to the ECU. Then, the CPU 51 determines whether or not updating of the control program of the ECU in the vehicle 1 is possible, based on the states of the respective power supplies, with reference to the determination table stored in the storage unit 55.

As for the determination table stored in the storage unit 55 of the management server 5, different vehicles 1 may have different determination tables, or may have the same determination table. The determination table may be stored in the storage unit 13 of the gateway 10 of each vehicle 1. In this case, the management server 5 refers to the determination table stored in the storage unit 13 of the gateway 10.

Fourth Embodiment

In the first to third embodiments, an exemplary case has been described in which the vehicle 1 has the power supply configuration shown in FIG. 6. However, the vehicle 1 is not limited to an engine vehicle which is a so-called conventional vehicle. FIG. 9 is a schematic diagram showing another example of the power supply configuration of the vehicle 1. FIG. 9 is a schematic diagram showing an example of a power supply configuration of a hybrid vehicle. With reference to FIG. 9, the vehicle 1 includes, as a plurality of power supplies, a first battery 21 as a main battery having a voltage such as 48 V, a second battery 22 as a sub-battery having a voltage, such as 12 V, lower than that of the first battery 21, and a motor-generator (MG) 25.

The first battery 21 and the MG 25 are connected to a power supply control ECU 30D, and supply power to the ECU 30D. The second battery 22 is connected to other ECUs 30C, and supplies power to the ECUs 30C.

A DC/DC converter 26 is connected between a circuit to which the first battery 21 and the MG 25 supply power and a circuit to which the second battery 22 supplies power. Since the DC/DC converter 26 performs voltage conversion between these circuits, the first battery 21 and the MG 25 are allowed to supply power to the other ECUs 30C, and the second battery 22 is allowed to supply power to the power supply control ECU 30D.

Even when the vehicle 1 has the above power supply configuration, updating of a control program can be reliably performed if determination as to whether or not updating of the control program is possible is performed in a similar manner to that described above.

Fifth Embodiment

The method of determining, by the CPU 11 of the gateway 10 or the CPU 51 of the management server 5, whether or not updating of a control program is possible is not limited to the method using the determination table. As another example, the determination may be performed using a determination function F that is defined so as to output a predetermined value according to the state of each of a plurality of power supplies that supply power to an ECU.

In the case where the vehicle 1 has the power supply configuration shown in FIG. 6, for example, determination function $F(x, y, z)=x+y+z$ is outputted with respect to state variables x to z defined as follows.

x: a variable representing the state of the first battery 21; $x=1$ indicating that the remaining power is enough, and $x=0$ indicating that the remaining power is little.

y: a variable representing the state of the second battery 22; $y=1$ indicating that the remaining power is enough, and $y=0$ indicating that the remaining power is little.

z: a variable representing the state of the ALT 23; $z=1$ indicating that the ALT 23 is being driven, and $z=0$ indicating that the ALT 23 is being suspended.

Based on the value of $F(x, y, z)$ obtained by assigning the values representing the states of the respective power supplies to the variables x, y, and z, respectively, the CPU 11 of the gateway 10 serving as a determination unit determines as follows.

$F(x, y, z) \geq 2$ . . . updating of the control program is possible $F(x, y, z) < 2$ . . . updating of the control program is not possible Also in the case of using the determination function F, whether or not updating of the control program is possible is determined based on the determination criterion that the control program updating process is executed when at least two of a plurality of power supplies that supply power to an ECU are able to output power required for updating the control program.

Sixth Embodiment

In the above description, the "battery (storage battery) state" (FIG. 7) means the charge state of a battery as described above, and indicates an amount of remaining power RC [Ah] of the battery. The amount of remaining power RC [Ah] of the battery is defined by the following formula (1) using a state of charge (SOC) and a full charge capacity FCC [Ah] of the battery.

$$RC = SOC \times FCC \quad (1)$$

For example, $SOC=20$ means that the amount of remaining power in the battery is 20% of the full charge capacity.

Since the battery deteriorates with use, the full charge capacity FCC decreases from an initial full charge capacity (design capacity) DC. The degree of non-deterioration (i.e., the state of health (SOH)) of the battery is defined by the following formula (2) using the full charge capacity FCC [Ah] and the design capacity DC [Ah].

$$SOH = FCC/DC \quad (2)$$

For example, $SOH=80$ means that the battery has been deteriorated to such an extent that the present full charge capacity is 80% of the initial full charge capacity.

Accordingly, the amount of remaining power RC is calculated by the following formula (3), based on formulae (1) and (2). When determining the states of the first battery 21 and the second battery 22 in step S105, the CPU 11 calculates an amount of remaining power RC of each battery by using the following formula (3).

$$RC = DC \times SOC \times SOH \quad (3)$$

The state of charge SOC and the state of health SOH of the battery are estimated based on a measured value obtained in each ECU. Estimation of the state of charge SOC and the state of health SOH is performed by the CPU 11 of the gateway 10, for example. A method for estimating the state of charge SOC and the state of health SOH is not limited to a specific method. For example, it has been known that the state of charge SOC has a certain relationship with an open circuit voltage (OCV) of the battery. By utilizing this relationship, the CPU 11 of the gateway 10 may estimate the state of charge SOC from a difference between the open circuit voltages OCV, before and after charging/discharging the battery, which are obtained from the power supply control ECU 30A. Alternatively, the state of health SOH may be estimated from a difference between the state of health SOC in the initial state and the state of charge SOC after use. The CPU 11 can estimate the amount of remaining power RC of each battery by substituting the estimated state of charge SOC and the estimated state of health SOH into formula (3).

Seventh Embodiment

The alternator (ALT) 23 described in the above embodiments is an example of an electric generator. Needless to say, an electric generator installed in a vehicle is not limited to an alternator (ALT).

In the above embodiments, it is determined whether or not an electric generator (e.g., ALT 23) is being driven (step S103), and the conditions, which are required of the states of the first battery 21 and the second battery 22 to determine that updating is "possible", are varied according to the result of the determination. This is because, even if the amount of remaining power of the battery is deficient during updating of the control program, power generated by the electric generator can be used for the updating. Therefore, the determination in step S103 as to whether or not the electric generator is being driven, preferably includes determination as to whether or not the state where the electric generator is being driven is maintained for a period until completion of the updating. The period until completion of the updating is estimated based on the size of the updating program, the throughput of the target ECU, etc. Maintaining the state where the electric generator is being driven is equivalent to that the period until completion of the updating is included in a scheduled drive period of the electric generator, or that the driving state of the electric generator is normal until completion of the updating, for example. In the former case, for example, the CPU 11 of the gateway 10 acquires the scheduled drive period from the traveling state of the vehicle 1, and performs the determination by comparing the scheduled drive period with the period until completion of the updating. In the latter case, for example, the CPU 11 of the gateway 10 acquires, from the power supply control ECU 30A or the like, an immediately preceding output value from the electric generator, and performs the determination by comparing the output value with an instruction value.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST

1 vehicle
2 wide-area communication network
5 management server (control apparatus)
6 DL server
10 gateway (control apparatus)
11 CPU (determination unit)
12 RAM
13 storage unit
14 in-vehicle communication unit
15 wireless communication unit
20 control circuit
21 first battery
22 second battery
23 ALT
24 starter
25 MG
26 DC/DC converter
29A, 29B relay
30, 30A to 30D ECU (on-vehicle control device)
30A power supply control ECU (detection unit)
31 CPU
32 RAM
33 storage unit
34 communication unit
35 start-up unit
51 CPU (determination unit)
52 ROM
53 RAM
54 storage unit
55 communication unit

The invention claimed is:

1. A control apparatus configured to control updating of a control program of an on-vehicle control device that controls a target device installed in a vehicle including a plurality of power supplies, the control apparatus comprising:
   a non-transitory computer readable memory;
   a hardware processor coupled to the non-transitory computer readable memory and configured to read instructions from the non-transitory computer readable memory to cause the control apparatus to perform steps comprising:
   detecting states of the plurality of power supplies that supply power to the target device, wherein the states of the plurality of power supplies are stored in a determination table comprising at least states of an electric generator in the vehicle, the step of detecting states includes at least detecting the states of the electric generator; and
   determining that updating of the control program is possible, when the states of the plurality of power supplies indicate that at least two of the plurality of power supplies are able to output power required for updating the control program.

2. The control apparatus according to claim 1, the determining step includes determining whether or not updating of the control program is possible, with reference to a determination table in which a result of determination as to whether or not updating of the control program is possible is defined in advance for each of combinations of the states of the plurality of power supplies.

3. The control apparatus according to claim 1, wherein the determining step includes determining whether or not updating of the control program is possible, by using a determination function that is defined so as to output a predetermined value for each of the states of the plurality of power supplies.

4. The control apparatus according to claim 1, wherein the plurality of power supplies include a storage battery, and the states of the power supplies include an amount of remaining power of the storage battery.

5. The control apparatus according to claim 4, wherein the detecting step includes calculating the amount of remaining power by multiplying a full charge capacity of the storage battery by a state of charge (SOC) of the storage battery.

6. The control apparatus according to claim 5, wherein the detecting step further includes calculating the full charge capacity of the storage battery by multiplying a design capacity of the storage battery by a state of health (SOH) of the storage battery.

7. The control apparatus according to claim 1, wherein the plurality of power supplies include an electric generator, and the states of the power supplies include whether or not the electric generator is being driven.

8. A method for updating a control program of an on-vehicle control device that controls a target device installed in a vehicle including a plurality of power supplies, the method comprising the steps of:

detecting states of the plurality of power supplies that supply power to the target device, wherein the states of the plurality of power supplies are stored in a determination table comprising at least states of an electric generator in the vehicle, the step of detecting states includes at least detecting the states of the electric generator; and determining that updating of the control program is possible, when the detected states of the plurality of power supplies indicate that at least two of the plurality of power supplies are able to output power required for updating the control program.

9. A non-transitory computer readable storage medium storing a computer program for causing a computer to function as a control apparatus configured to control updating of a control program of an on-vehicle control device that controls a target device installed in a vehicle including a plurality of power supplies, the computer program causing the computer to execute the steps of:

detecting states of the plurality of power supplies that supply power to the device, wherein the states of the plurality of power supplies are stored in a determination table comprising at least states of an electric generator in the vehicle, the step of detecting states includes at least detecting the states of the electric generator; and determining that updating of the control program is possible, when the states of the plurality of power supplies indicate that at least two of the plurality of power supplies are able to output power required for updating the control program.

* * * * *